United States Patent
Wu et al.

(10) Patent No.: US 7,211,798 B2
(45) Date of Patent: May 1, 2007

(54) OCCUPANCY WALL SENSOR

(75) Inventors: Yun Wu, Bayside, NY (US); John Bandringa, Everett, WA (US); Paul Soccoli, New Hyde Park, NY (US); Nehal Shah, Westbury, NY (US); Alfred J. Lombardi, Syosset, NY (US); Edward Uftring, Syosset, NY (US); Adam Kevelos, Plainview, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/207,729

(22) Filed: Aug. 22, 2005

(65) Prior Publication Data

US 2006/0138329 A1    Jun. 29, 2006

Related U.S. Application Data

(60) Provisional application No. 60/604,543, filed on Aug. 26, 2004.

(51) Int. Cl.
*G01J 5/02*    (2006.01)

(52) U.S. Cl. .................. 250/342; 250/353; 250/DIG. 1
(58) Field of Classification Search ............... 250/342, 250/353, DIG. 1; 340/567
See application file for complete search history.

(56) References Cited

U.S. PATENT DOCUMENTS

| | | | | |
|---|---|---|---|---|
| 5,780,854 | A | * | 7/1998 | Lin .......................... 250/338.1 |
| 6,100,803 | A | * | 8/2000 | Chang ........................ 340/567 |
| 6,781,129 | B2 | * | 8/2004 | Leen .......................... 250/342 |
| 2005/0116171 | A1 | * | 6/2005 | Lee et al. ................... 250/342 |

* cited by examiner

*Primary Examiner*—Constantine Hannaher
(74) *Attorney, Agent, or Firm*—Paul J. Sutton

(57) ABSTRACT

A sensor mounting mechanism that includes a base member adapted to be mounted to a structure and a base neck having a first end and a second end where the first end is adapted to be coupled to a sensor with a ball-socket coupling and the second end is coupled to the base member with a rotating coupling. The mounting mechanism provides fine and coarse adjustment means for adjusting the scanning area of the sensor such as an PIR occupancy sensor without the use of a tool. The sensor includes a detachable lens holder for easy replacement of the lens.

14 Claims, 9 Drawing Sheets

OCCUPANCY WALL SENSOR

This application claims the benefit of the filing date of a provisional application having Ser. No. 60/604,543 which was filed on Aug. 26, 2004.

BACKGROUND OF THE INVENTION

1. Field of the Invention

The present invention relates to occupancy wall sensors.

2. Description of the Related Art

Normally, newly installed occupancy wall sensors, such as passive infrared (PIR) and/or ultrasonic occupancy wall sensors, when first installed, need to be positioned on a wall or ceiling and then oriented to scan an area of interest to provide the level of protection desired by the user. Frequently, the sensors, after being mounted to the wall or ceiling, must normally then be re-oriented a few times until they actually scan the area desired. Also, as the users needs change, existing wall sensors may need to be re-positioned and re-oriented to scan different areas at, possibly, different viewing angles.

Some current sensors may require a special tool which is provided by the manufacturer for use when installing and/or orienting the sensors the required adjustments. Sometimes the tool may not be readily available, particularly when the sensor is being re-positioned or re-oriented some time after first being installed on a wall. This type of adjustment can not only be difficult to perform, but can sometimes result in damage to the sensor as it is being re-mounted to the wall or being disassembled and then reassembled.

A key component of a sensor is the PIR lens. It is usually made of a thin, soft plastic material, the surface of which is prone to being scratched. The lens is usually relatively large to allow the sensor to cover a scanning area or scan a large field of view and, as the lens is mounted on the front surface of the sensor, it is prone to being damaged. For example, during the manufacture, shipping, handling and installation of the sensor the lens, which is a delicate and crucial component of the sensor, can be easily scratched or damaged. A scratched or damaged lens can prevent the sensor from operating properly. The lens on a sensor is not normally replaceable.

Another problem with current wall mounted sensors is the absence of a simple way of mounting the sensors to a wall or ceiling. Often, and particularly in industrial applications, the sensor can be located 30 feet or more above the floor. Thus, while on a ladder, the installer may have to hold the sensor over his/her head with one hand while trying to mount the sensor to the wall or ceiling with the other hand.

What is needed is a sensor which can be easily and quickly mounted to a wall or ceiling, oriented to scan a desired area, and has a lens that is quickly and easily replaceable.

SUMMARY OF THE INVENTION

The present invention helps overcome some of the above problems by providing an occupancy sensor which can be quickly and easily mounted and oriented to scan a specific coverage or scanning area without requiring a special installation tool. The sensor includes a relatively light weight, single piece mounting base which is separate from the body of the sensor and which can be mounted to a structure such as a wall or ceiling without requiring the installer to support the weight of the body of the sensor. Thereafter, the body of the sensor is mounted into the base which is mounted to the wall or ceiling and the sensor body is twist locked to the base to obtain coverage of different scanning areas. Additional adjustments can be made by loosening a threaded fastener such as a nut on the back of the sensor body. To help overcome the damage lens problem, the sensor includes a replaceable PIR lens with a snap on lens holder which can be attached to the sensor.

In one aspect of the invention, an occupancy sensor is disclosed that includes a base member adapted to be mounted to a structure such as a wall or ceiling, a PIR sensor and a base neck having a first end and a second end. The first end is coupled to the sensor with a ball-socket coupling and the second end is coupled to the base member with a rotating coupling. The ball-socket coupling and the rotatable coupling mechanism provide a combination of two freedoms of rotation for improved sensor adjustment. The lens is part of a replaceable lens holder which allows for easy replacement of a damaged lens. The techniques of the present invention are also applicable to other occupancy sensing technologies such as ultrasonic and microwave means.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWING

Other aspects, features and advantages of the present invention will become more fully apparent from the following detailed description, the appended claims, and the accompanying drawings in which similar elements are given similar reference numerals:

DETAILED DESCRIPTION OF THE INVENTION

Figure 1A:
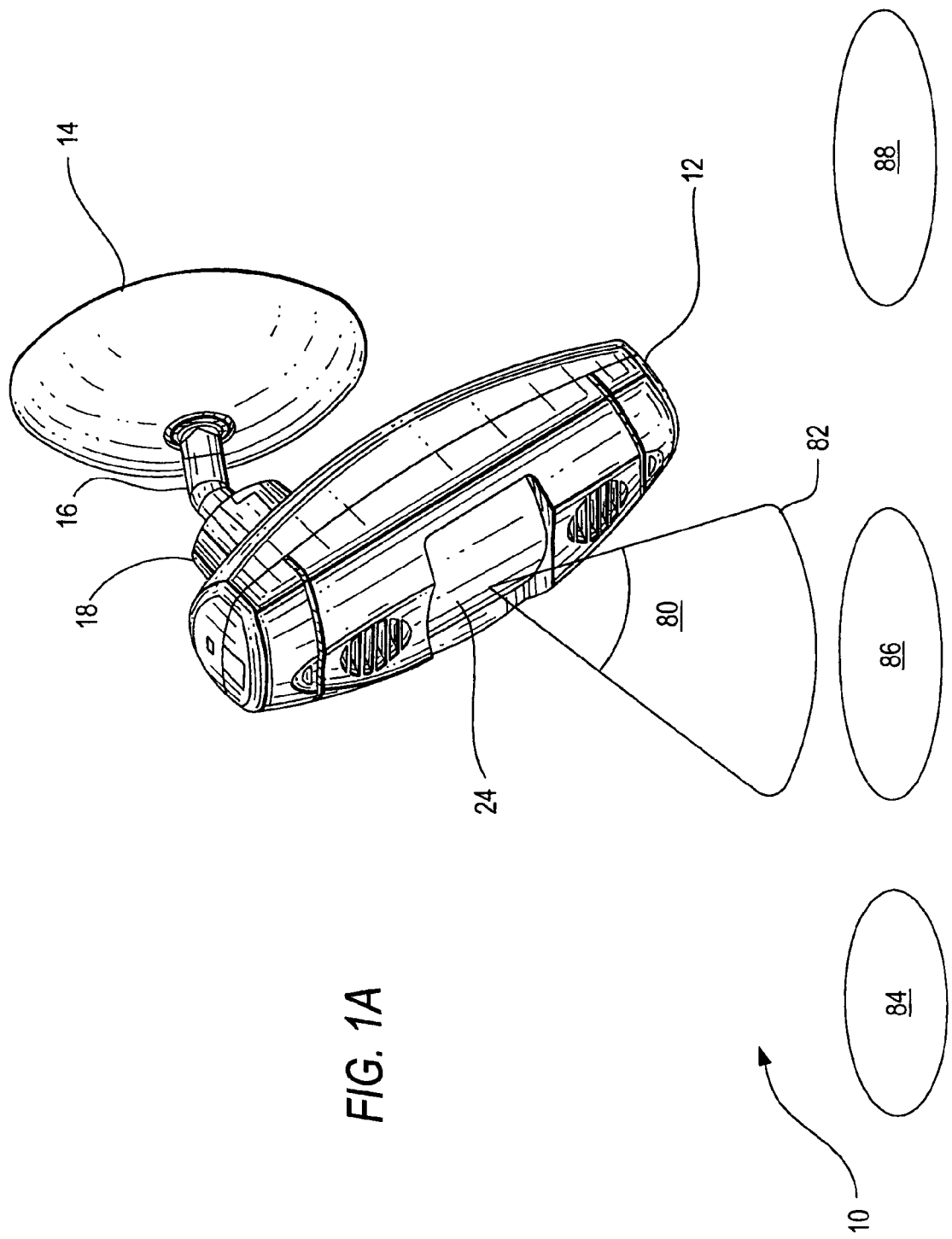
FIGS. 1A–1D are an isometric view, front view, side view and back view of an occupancy sensor in accordance with the principles of the invention.
Figure 1B:
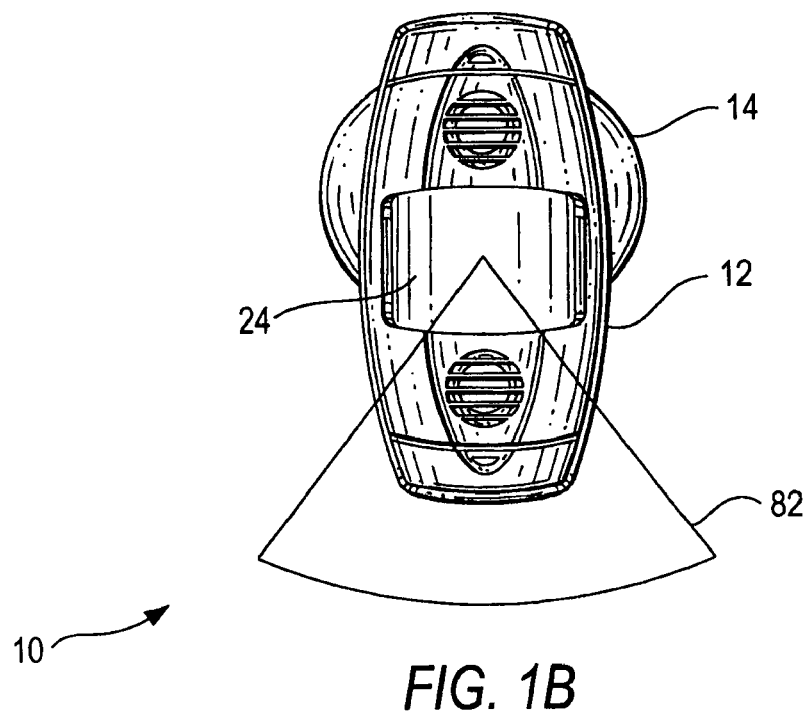
Figure 1C:
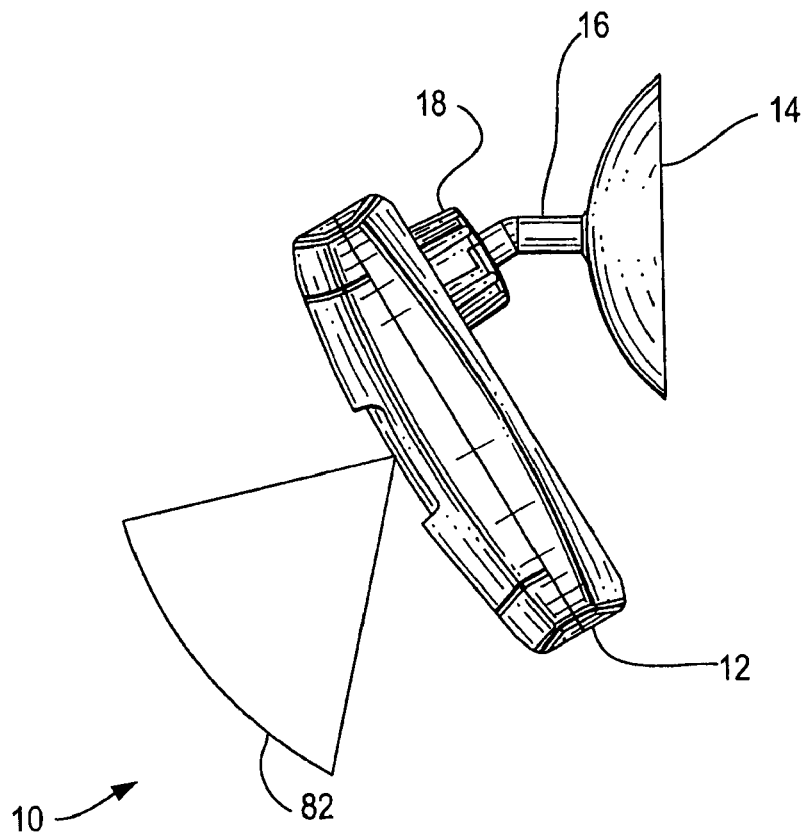
Figure 1D:
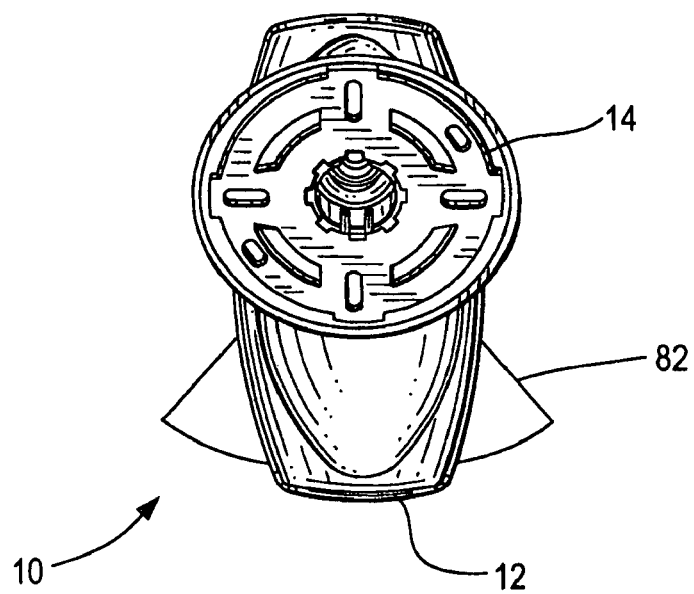

The present invention discloses an occupancy sensor having a passive infrared (PIR) lens holder coupled to a versatile mounting mechanism for adjusting the scanning or coverage area of the sensor without the use of a tool. The mounting mechanism includes a base neck member having a first end employing a ball-socket coupling to the PIR lens holder sensor body and a second end using a rotatable coupling to a mounting base. The ball-socket coupling and the rotatable coupling mechanism provide a combination of two freedoms of rotation for enhanced sensor adjustment.

The lens is part of a replaceable lens holder which allows for easy replacement of a damaged lens. Although one embodiment of the present invention is directed to PIR sensing means, the techniques of the present invention are also applicable to other occupancy sensing technologies such as ultrasonic microwave means or a combination thereof.

Referring to FIGS. 1A–1D, there is shown different views of an occupancy sensor 10 in accordance with the principles of the invention. The sensor 10 includes a sensor body 12 with a replaceable lens holder 24 and a mounting mechanism comprising a base neck 16, nut 18 or other threaded fastener, and mounting base 14 for mounting the body 12 to a surface or structure such as a wall or ceiling. The lens holder 24 has a PIR lens with a fixed scanning range 82 defined by scanning angle 80 used for detecting the presence of occupants in different scanning (coverage) areas such as 84, 86 and 88. The mounting mechanism provides fine and course adjustment means for adjusting or orienting the position of the sensor body 12 to allow the scanning range 82 to cover different scanning areas 84, 86, 88. For example, the scanning range 82 of the sensor 10 is shown covering the scanning area 84. However, the sensor body 12 can be easily adjusted to cover scanning area 86 or 88 (as well as overlap areas), without having to adjust the scanning range 82 or angle 80. The course adjustment means is achieved by detaching the base neck 16 from the base 14, rotating the base neck 16 around the mounting base 14 to a desired position and then reinserting the base neck into the base. The fine adjustment means is obtained by loosening the nut 18, rotating the sensor body 12 around the base neck to a desired position and then retightening the nut. By providing a sensor body 12 separate from the mounting base 14, an installer can mount and orient the sensor 10 without having to support the weight of the sensor body 12 and without requiring a separate tool. In addition, the replaceable lens holder 24 can be easily detached for replacement of a damaged PIR lens.

Figure 2:
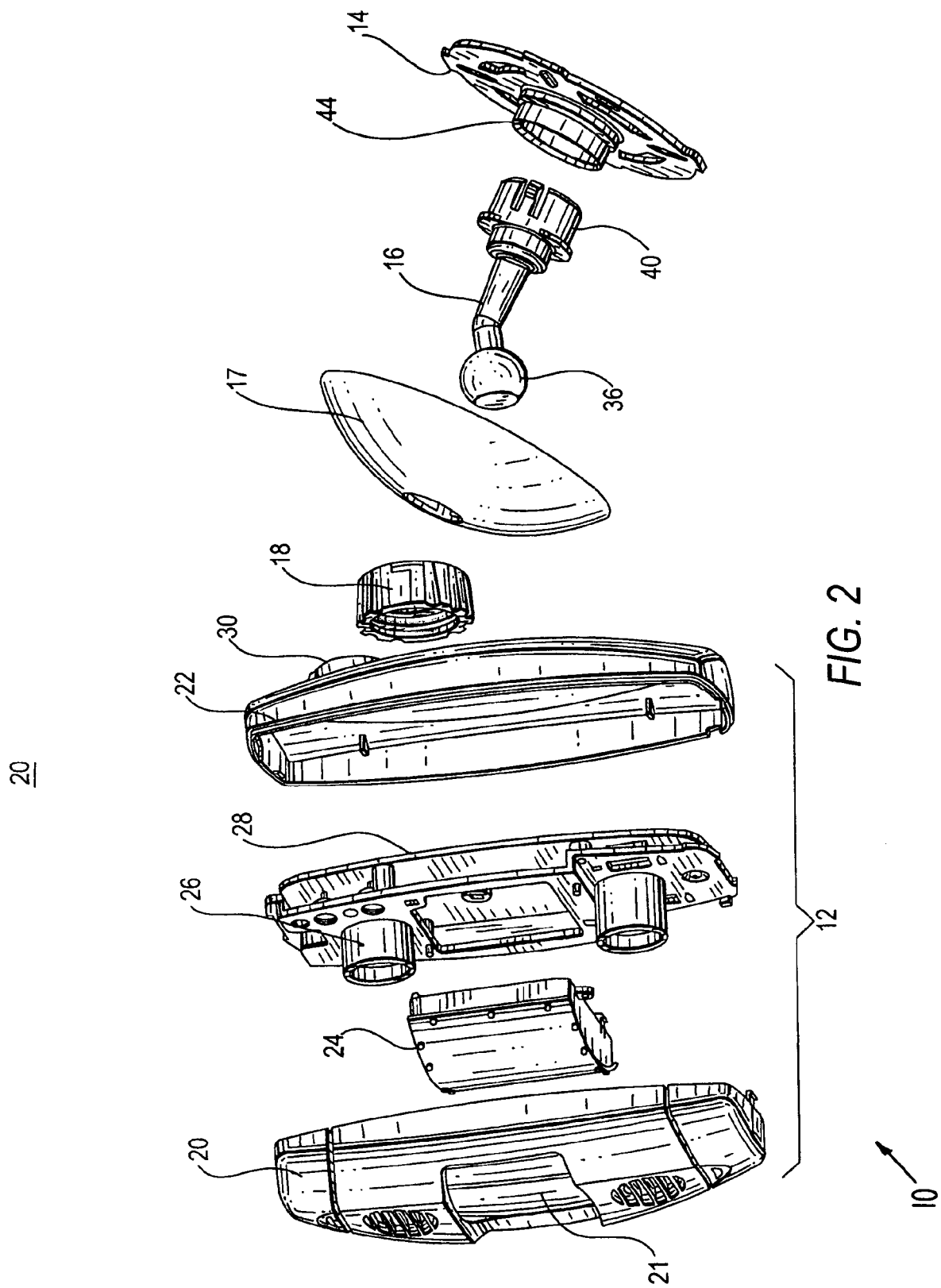
FIG. 2 is an exploded view of the sensor of FIG. 1.

FIG. 2 shows an exploded view of the sensor 10 of FIG. 1 in accordance with the principles of the invention. The rear side of the lens holder 24 is mounted to the front side of frame 26 and a printed circuit board (PCB) 28 having occupancy sensing circuitry is mounted to the rear side of the frame 26 forming a sensor unit assembly. The sensor unit assembly is mounted within the chamber of the back cover 22. A front cover 20 is mounted over the sensor unit assembly to form sealed sensor body 12. The front cover 20 has an opening 21 to expose the front side or lens portion of the lens holder 24. The front end of the base neck 16 has a ball shaped member 36 to couple to a cylindrical member 30 extending from the rear side of the back cover 22 to provide a ball-socket coupling. The front end of the base neck 16 is fastened to the cylindrical member 30 with the nut 18. The rear end of the base neck 16 has a cylindrical member 40 that fits in and is rotatably coupled to a cylindrical member 44 extending from the front side of the mounting base 14. A semi-spherical shaped base cover 17 is mounted over the mounting base 14 to provide an aesthetically pleasing appearance. The components of the sensor 10 can be made of various materials such as plastic, metal or a combination thereof.

Figure 3A:
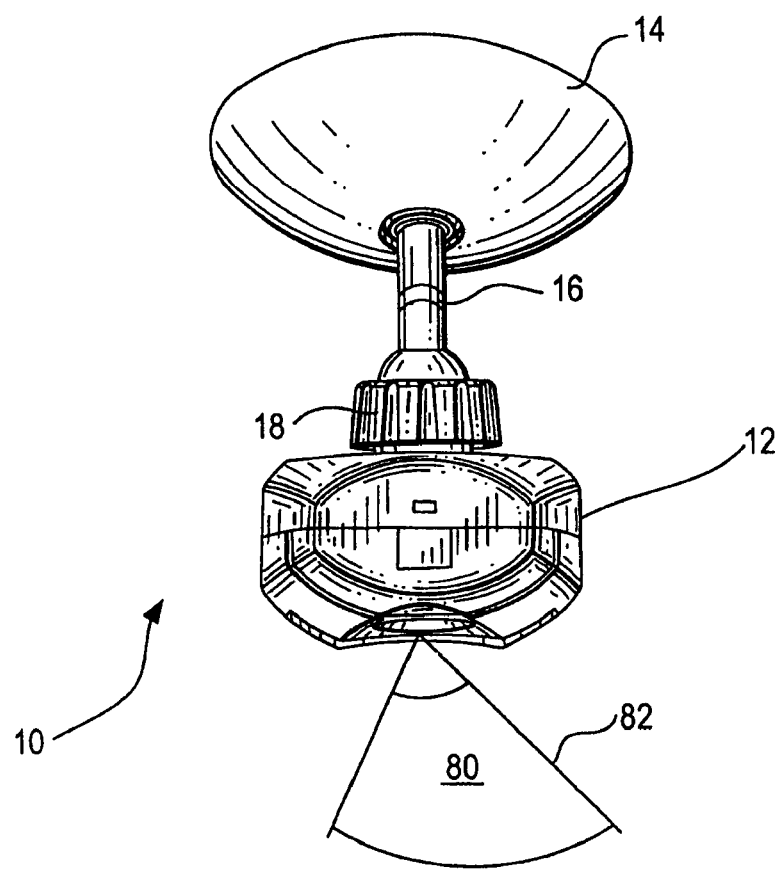
FIGS. 3A–3C show the sensor of FIG. 1 adjusted to different positions.
Figure 3B:
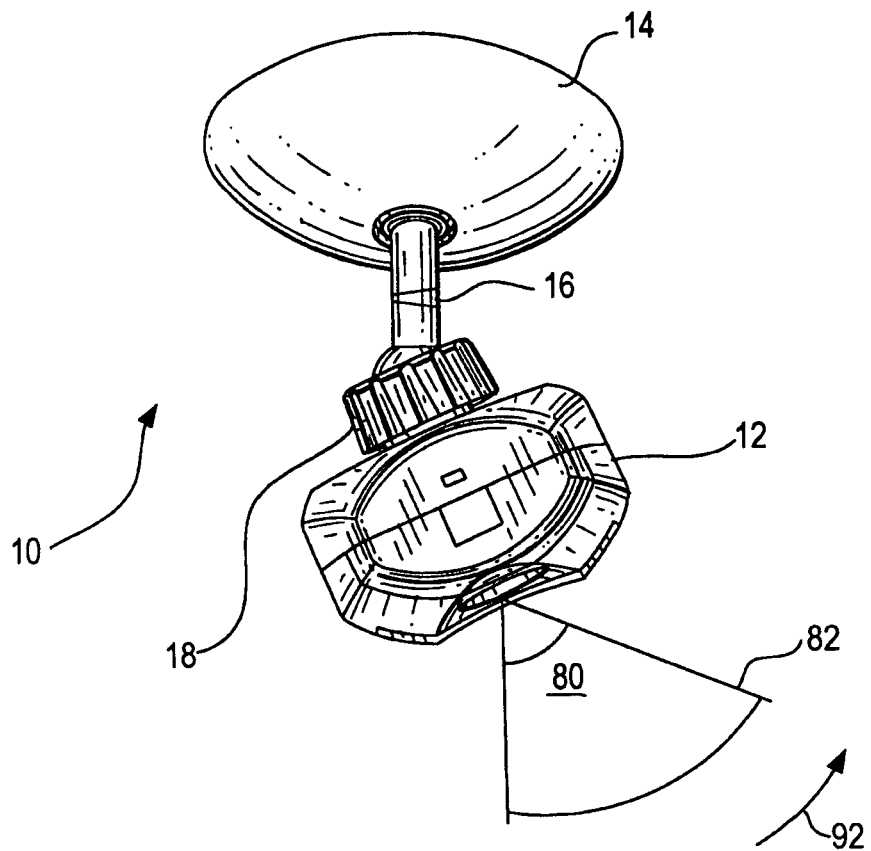
Figure 3C:
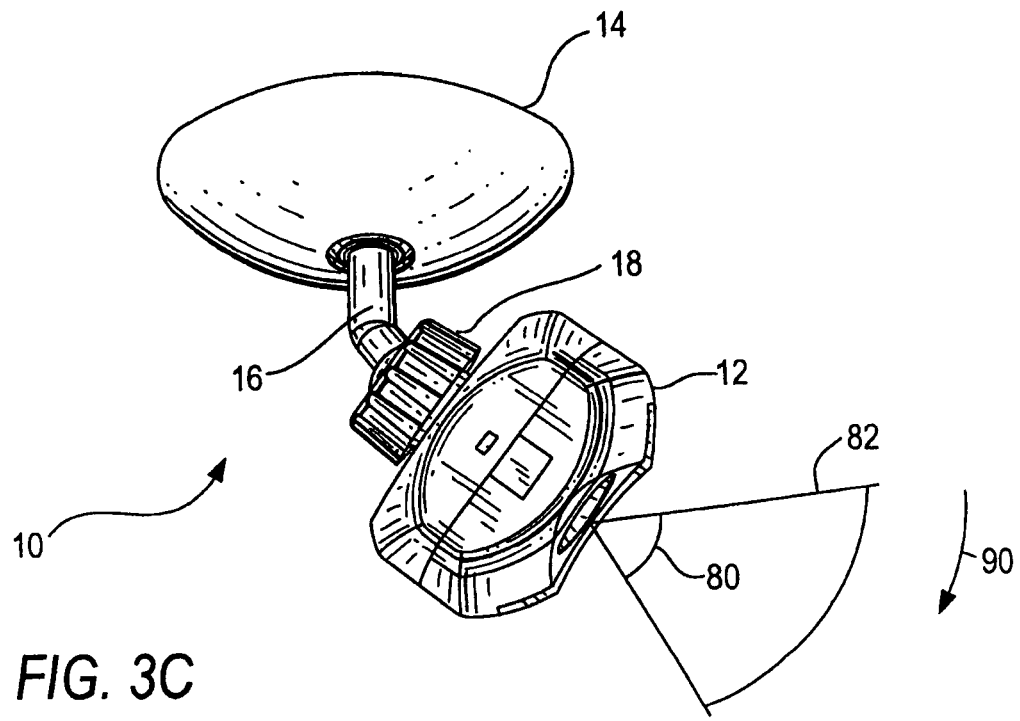

FIGS. 3A–3C show the mounting mechanism of the sensor 10 for adjusting the scanning or coverage areas of the sensor. As explained above, the mounting mechanism, which comprises base neck 16, nut 18 and mounting base 14, provides course and a fine adjustment means for adjusting the scanning or coverage area of the sensor 10. In FIG. 3A, the sensor body 12 is oriented or positioned to provide a scanning range 82 with an angle 80 to cover a particular scanning area. It should be noted the scanning range 82 and angle 80 typically have a 3-dimensional cone shape profile but only a 2-dimensional pie shape profile is shown for ease of explanation. FIG. 3B shows how the fine adjustment means can be used for rotating the sensor body 12 in the direction 92 to cover a new scanning area with the same scanning range 82 as FIG. 3A. To adjust, the nut 18 is loosened by unthreading the nut from the sensor body 12, the sensor body 12 is twisted or rotated in the direction shown by arrow 92 to a new position to cover a new scanning area and the nut 18 is then retightened to secure the new position of the sensor body 12. FIG. 3C shows how the course adjustment means can be used for rotating the sensor body 12 in the direction 90 to cover a new scanning area with the same scanning range 82 as FIG. 3A. To adjust, the base neck 16 is detached from or pulled out of the mounted base 14, the base neck is rotated in the direction shown by arrow 90 to a new position to cover a new scanning area and then it is reattached or reinserted into the mounting base to secure the sensor body 12 to the new position.

Figure 4A:
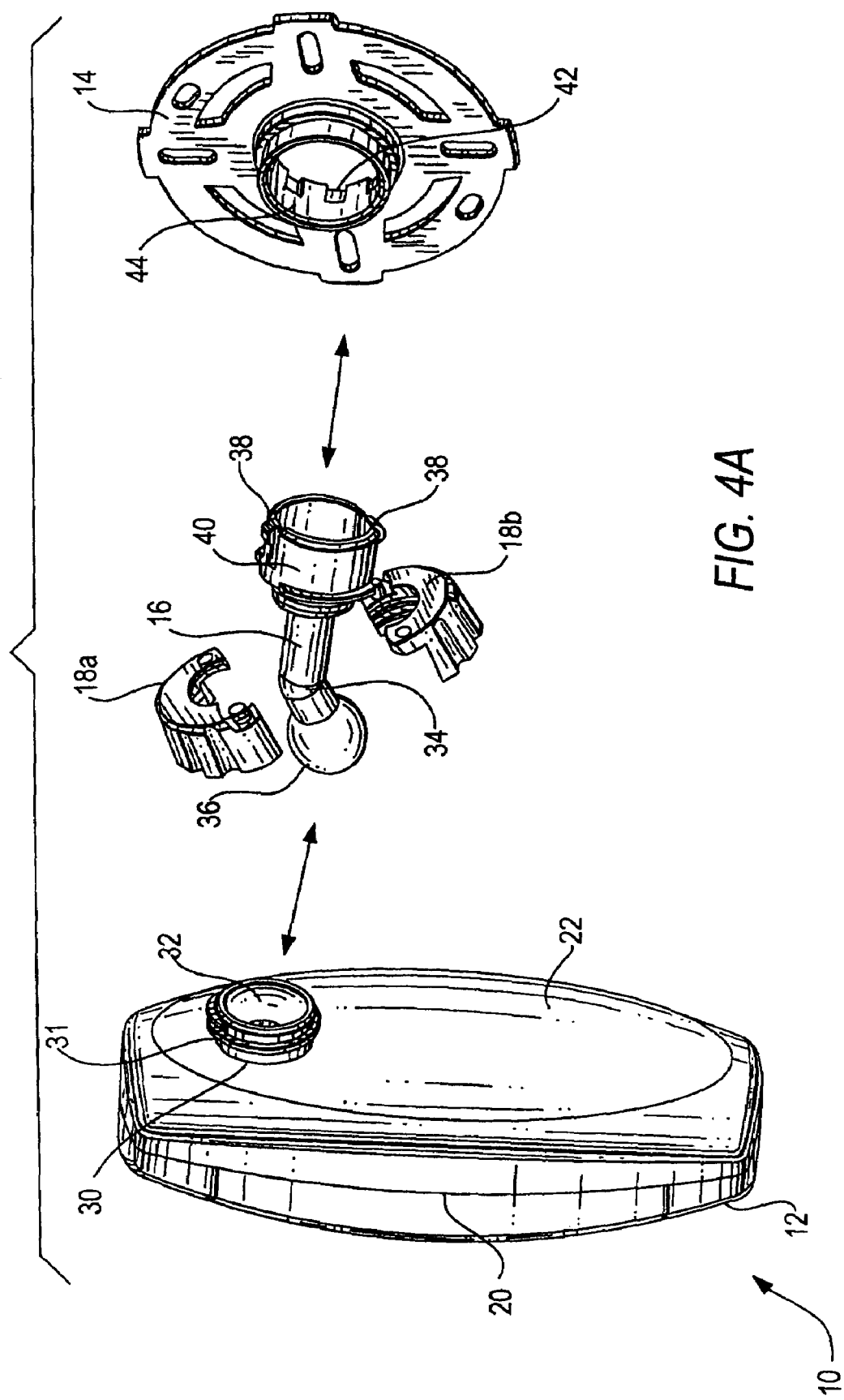
FIG. 4A shows another exploded view of the sensor of FIG. 1.

FIG. 4A shows the sensor body assembly 12 coupled to the mounting mechanism of the sensor 10 of FIG. 2. As explained above, the mounting mechanism, which comprises nut 18, base neck 16 and mounting base 14, provides fine and course adjustment means for the sensor 10. The inside periphery of the cylindrical member 30 of the back cover 22 is a socket having a semi-spherical surface 32 adapted to rotatably accept the ball element 36 of the base neck 16. The ball element 36 is secured in place by nut 18 (18a, 18b) when the nut is tightened and, when the nut 18 is loosened, the sensor body 12 is free to rotate around the ball element 36 to provide a fine adjustment means. The nut 18 is formed by a first nut half 18a and a second nut half 18b which can be detachably coupled to each other to form the single nut assembly 18.

Figure 4B:
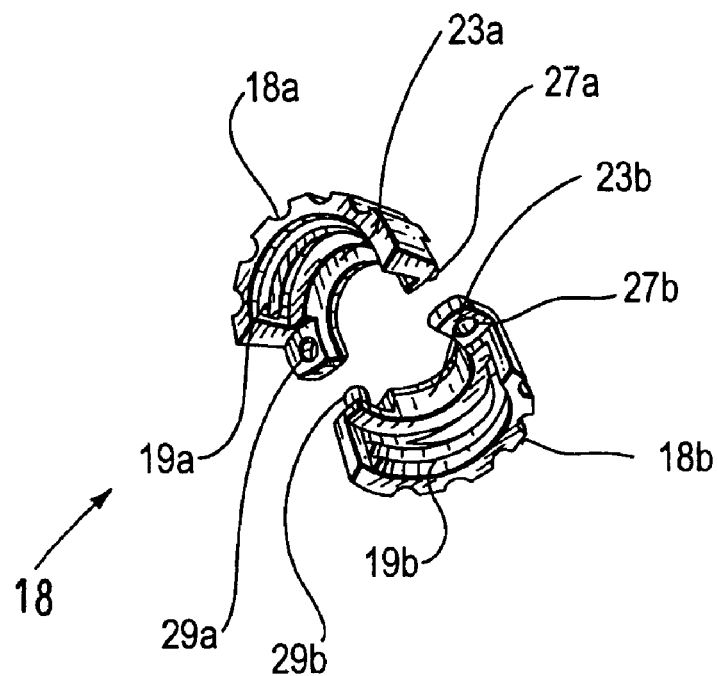
FIG. 4B shows an exploded view of the fastener of the sensor of FIG. 1.

For example, in one embodiment, FIG. 4B shows first nut half 18a having a stud 27a and an opening 29a for engaging with a respective opening 27b and stud 29b on second nut half 18b to secure or lock the halves 18a, 18b together to form a single nut assembly 18. Internal threads 19a, 19b located on the inside peripheries of the respective nut halves 18a, 18b are adapted for threading onto the external threads 31 located on the outside periphery of the cylindrical member 30 of the back cover 22. Partial spherical surfaces 23a, 23b located on the inside peripheries of respective nut halves 18a, 18b are adapted to rotate with the ball element 36 of the base neck 16 to provide a ball-socket or rotabable coupling.

Referring to FIG. 4A, the rear end of the base neck 16 permits the sensor body 12 to be rotated to one of several different positions and provides the second freedom of movement associated with the course means of adjustment. The rear end of the base neck 16 has a cylindrical member 40 which cooperates with the cylindrical member 44 in the mounting base 14 to orient and lock the base neck to the member 40. The base neck 16 can have a bend portion 34, located midway on the base neck, with a particular angle such as 30 degrees as shown in FIG. 3C. In one embodiment, the cylindrical member 40 of the base neck 16 is sized to slide and fit snugly within the cylindrical member 44 of the mounting base 14. The cylindrical member 40 has two snap tabs 38 which are 180 degrees spaced apart and extend from the periphery of the cylindrical member. The two snap tabs 38 are adapted to cooperate with a pair of the 8 slots 42 evenly spaced apart located on the inside periphery of the cylindrical member 44. This arrangement permits the base neck 16 to be rotated or turned to one of 8 different positions in the same plane as the mounting base 14.

During assembly, the nut halves 18a, 18b are assembled to form nut assembly 18 and then placed over the ball element 36 of the base neck 16. As the ball element 36 is inserted into the cylindrical member 30 of the back cover 22, the internal threads 19a, 19b of the nut 18 (FIG. 4A) engage the external threads 31 of the cylindrical member 30 of the back cover 22. As the nut 18 is tightened to the threads 31, the two partial spherical surfaces 23a, 23b (FIG. 4B) urge the ball element 36 against the semi-spherical surface 32 of the back cover 22. The ball element 36 is locked into a position by the three spherical surfaces 23a, 23b, 32 and the sensor body 12 is secured to the front end of the base neck 16.

The rotation of the sensor body 12 about the ball element 36 provides a first freedom of body rotation providing a scanning area which can be easily changed by loosening and then retightening the nut. That is, tightening the nut assembly 18 (18a, 18b) locks the sensor body 12 to the base neck 16 to secure the new position of the sensor body. Loosening the nut assembly 18 allows the position of the sensor body to be changed to provide a new scanning or coverage area.

As the cylindrical member 40 of the base neck 16 is inserted into the cylindrical member 44 of the mounting base 14, the two flexible snap tabs 38 are urged inward towards the center of the opening of the member 40. The cylindrical member 40 can be rotated inside the cylindrical member 44 until the snap tabs 38 engage one of the 8 slots 42 causing the snap tabs 38 to position themselves within the slots to lock the sensor body into one of the 8 positions. Different positions of the base neck 16 provide a second freedom of body rotation. The total rotation of the sensor body 12 is the combination of two freedom of rotations: the first freedom of rotation is provided by ball-socket coupling which allows the ball element 36 to be rotated around the sensor body 12 and the second freedom of rotation is provided by the rotatable coupling which allows the base neck 16 to be rotated around the mounting base 14.

Figure 5:
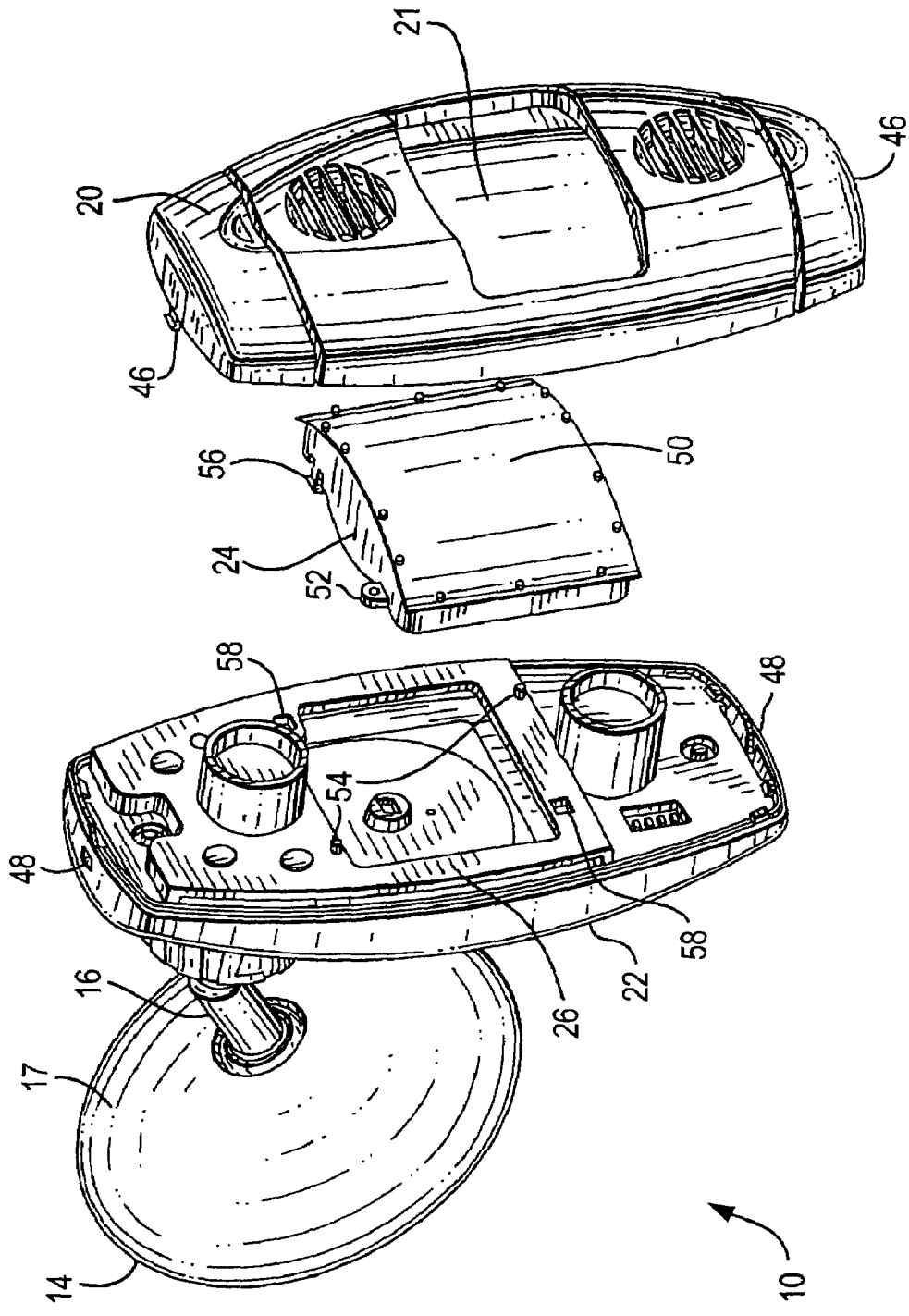
FIG. 5 shows the replacement lens feature of the sensor of FIG. 1.

FIG. 5 shows a detailed view of the replaceable PIR lens holder 24 of the sensor 10 of FIG. 1. A lens 50 is fixed to the front of the lens holder 24 by ultrasonic welding or other attachment means. A lug 52 with openings and a spaced apart snap tab 56 extend from the top and another lug and tab pair extend from the bottom portion (not shown) of the lens holder 24. Two spaced apart locating pins 54 on the frame 26 are coordinately located relative to the lugs 52 of the lens holder 24 and are sized to be received by the openings in the lugs. Likewise, two spaced apart slots 58 on the frame 26 are coordinately located relative to the snap tabs 56 of the lens holder 24 and are sized to receive the snap tabs 56. Both the pins 54 and lugs 52 are keyed for one way assembly to insure that the lens holder 24 is properly oriented relative to the frame 26 as it is attached to the frame. The lens holder 24 is attached to (snaps on) the frame 26, and the frame is held inside the enclosure comprising the front cover 20 and the back cover 22. This arrangement allows the lens to be properly oriented and easily replaced when necessary. The front cover 20 has a snap tab 46 on the top edge and another snap tab on the bottom edge (not shown). The back cover 22 has two corresponding slots 48 on the top and bottom edges. The snap tabs 46 are located relative to the slots 48 to allow the covers 20, 22 to be detachably coupled to each other to form a single assembly sensor body.

In addition, to using PIR sensing techniques, the present invention is also applicable to other occupancy sensing technologies such as ultrasonic and microwave means. For example, sensor 10 can be configured to transmit ultrasonic signals and monitor changes in the signals return time to detect occupancy. The sensor also can combine PIR and ultrasonic sensing technologies for highly accurate monitoring with minimum false triggering. The sensor 10 of the present invention can be employed in various applications such as for monitoring conference rooms, restrooms, stockrooms, stairwells and parking garages in commercial and institutional facilities. In addition, the sensor can be adapted to monitor porches, patios, hallways and backyards in residential settings.

Figure 6B:
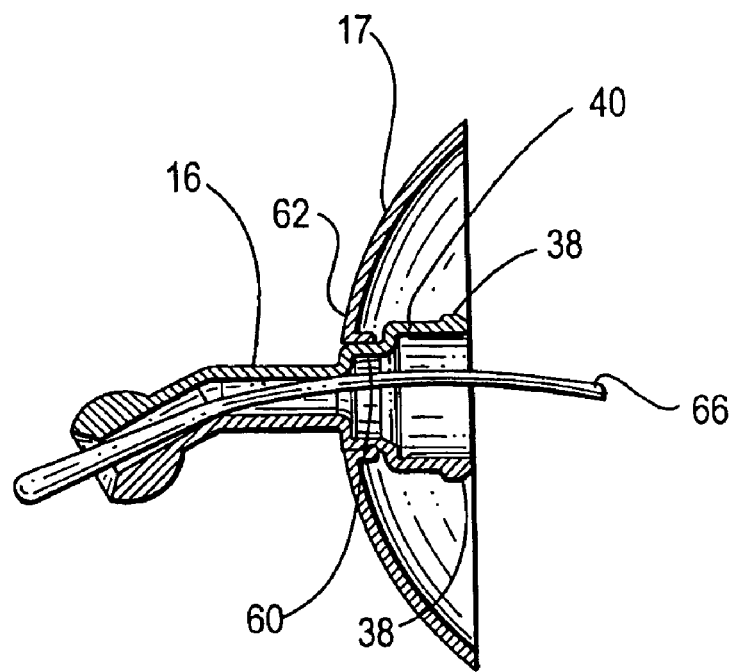
FIGS. 6A–6B show the sensor mounting arrangement of FIG. 1.
Figure 6A:
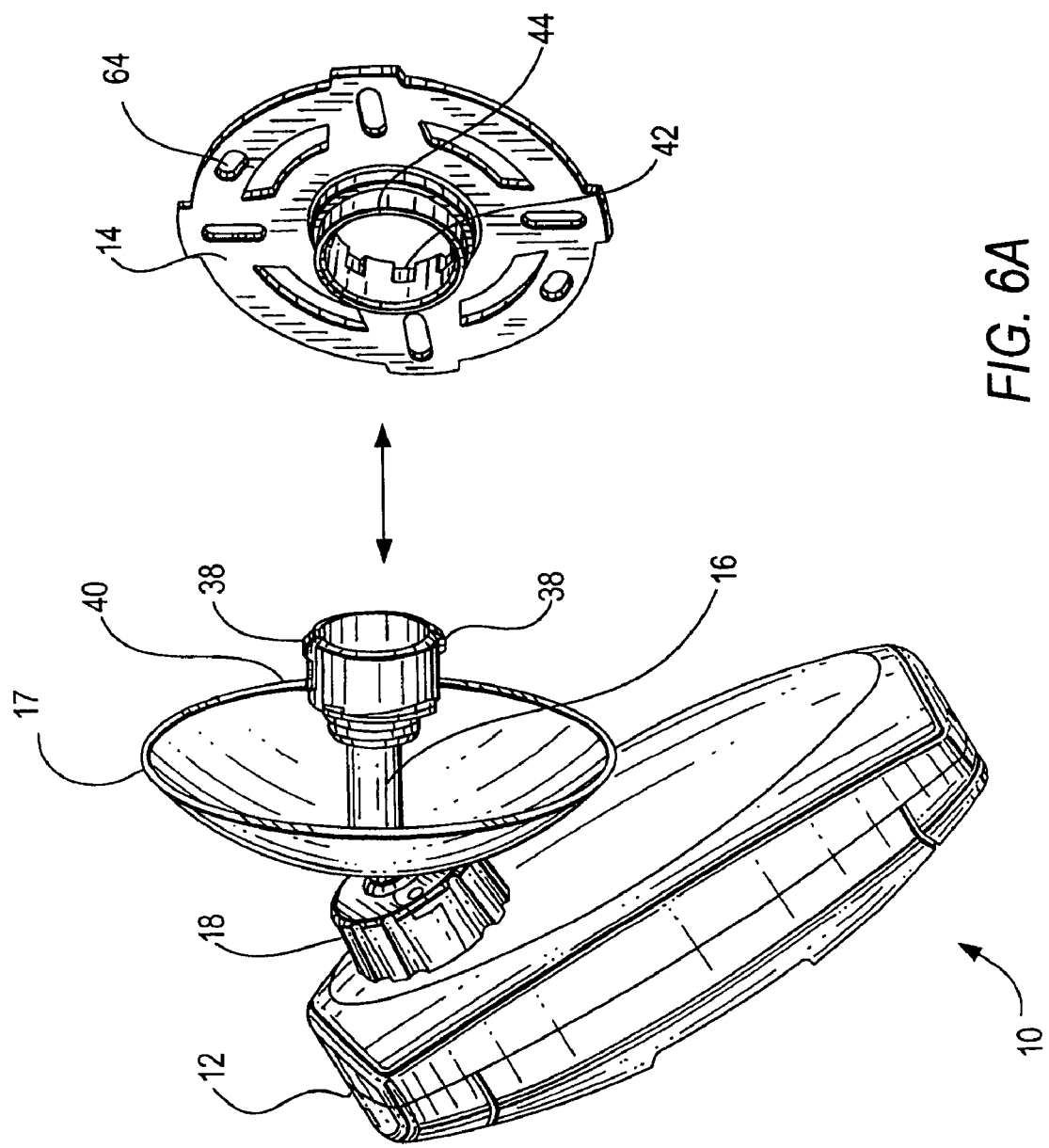

Referring to FIGS. 6A–6B, the mounting base 14 is provided for mounting sensor 10 to a wall, ceiling or other structure or surface. Mounting base 14 has openings 64 for receiving screws for attachment to a wall, ceiling or electrical junction box. Once the mounted base 14 is attached, a cable 66 (FIG. 6B) or other conductor from inside the wall or ceiling can be pulled through a center opening of cylindrical member 44 and attached to terminals in the sensor body 12. The cylindrical member 40 of the base neck 16 is inserted into the cylindrical member 44 of the mounting base 14. The leading end of the two snaps 38 are chamfered at approximately 45 degrees and the back ends are chamfered at approximately 30 degrees to permit the base neck 16 to be easily inserted into and removed from the cylindrical member 44. The base neck 16 is detached from the mounting base 14 by having the two snap tabs 38 overcome the shoulders of the slots 42. As the cylindrical member 40 on the base neck 16 is inserted into the cylindrical member 44, the shoulder on the base neck 16 engages the top end of the cylinder to define the depth of penetration. The base neck 16 can be rotated slightly to allow the two snap tabs 38 to engage the nearest two of eight slots 42 to lock the sensor body 12 into position. To complete the installation, referring to FIG. 6B, the base cover 17 is placed over the cylindrical member 40 and advanced until lip 62 engages groove 60 on the cylindrical member 40 to form a secure connection.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. A sensor mounting mechanism comprising:
a base member adapted to be mounted to a structure; and
a base neck having a first end and a second end, said first end adapted to be coupled to a sensor with a ball-socket coupling and said second end coupled to said base member with a rotating coupling, said sensor mounting mechanism further comprising a split nut having two partial spherical surfaces and split internal threads coupled to the first end of said base neck to engage threads on said sensor and a threaded fastener for tightening and loosening the base neck to the sensor.

2. The sensor mounting mechanism of claim 1 wherein the threaded fastener is a two piece nut assembly comprising a first nut half and a second nut half adapted to form the two piece nut assembly.

3. The sensor mounting mechanism of claim 1 wherein the base neck has a channel extending therethrough to allow electrical conductors to be connected from the base member to the sensor.

4. The sensor mounting mechanism of claim 1 wherein the ball-socket coupling comprises a ball element located on the base neck and a socket located on the sensor.

5. The sensor mounting mechanism of claim 1 wherein the rotating coupling comprises a first cylindrical member located on the base neck and a second cylindrical member located on the base member.

6. The sensor mounting mechanism of claim 4 wherein the first cylindrical member fits within the second cylindrical member.

7. The sensor mounting mechanism of claim 4 wherein the first cylindrical member has at least two snap tabs positioned to engage with at least two slots located on the second cylindrical member.

8. The sensor mounting mechanism of claim 4 further comprising a base cover for mounting over the base member to conceal said base member.

9. A sensor mounting mechanism comprising:
a base member adapted to be mounted to a structure; and
a base neck having a first end and a second end, said first end adapted to be coupled to a sensor with a ball-socket coupling and said second end coupled to said base member with a rotating coupling, said sensor mounting mechanism comprising a housing having a front surface for holding a detachable PIR lens holder wherein the housing is a two piece housing assembly comprising a front cover and a back cover wherein the front cover has an opening for exposing a portion of the front surface of the detachable PIR lens holder and the back cover is coupled to the base neck.

10. The sensor mounting mechanism of claim 9 further comprising a frame having a front side for holding the detachable lens holder and a rear side for holding a printed circuit board having circuitry for the sensor.

11. The sensor mounting mechanism of claim 9 wherein the base neck has a bend located between the first and second end of the base neck.

12. The sensor mounting mechanism of claim 9 wherein the structure is a preexisting structure including one of a wall and a ceiling.

13. The sensor mounting mechanism of claim 9 wherein the base neck is a tube shaped member having a bend located between the first and second end of the base neck.

14. The sensor mounting mechanism of claim 9 wherein the sensor is a PIR sensor having a lens with a rectangular shaped lens with a front convex surface.

* * * * *